Nov. 27, 1956   A. G. BREIDFJORD   2,771,702
FISHING TRAWLS

Filed Aug. 9, 1952   2 Sheets-Sheet 1

INVENTOR
AGNAR GUDMUNDSSON BREIDFJORD
BY
Richardson, David and Nordon
his AGENTS.

Nov. 27, 1956  A. G. BREIDFJORD  2,771,702
FISHING TRAWLS

Filed Aug. 9, 1952  2 Sheets-Sheet 2

INVENTOR
AGNAR GUDMUNDSSON BREIDFJORD

BY
Richardson, David and Nordon
his AGENTS

United States Patent Office 2,771,702
Patented Nov. 27, 1956

2,771,702

FISHING TRAWLS

Agnar Gudmundsson Breidfjord, Reykjavik, Iceland

Application August 9, 1952, Serial No. 303,518

4 Claims. (Cl. 43—9)

This invention relates to trawls for use in fishing. Trawls commonly referred to as "bottom trawls" are already known which are adapted only for fishing by dragging the trawl over the sea bed so that the bottom of the sea bed is scraped by the trawl with consequent damage to the sea vegetation so that the breeding grounds of the fish and the home of the young fish or fry is spoiled with consequent enormous destruction of potentially immature fish.

Such bottom trawls comprise a trawl net of substantially pocket-like configuration having an open mouth at one end thereof, the lower edge of the trawl mouth being connected at each end thereof to one of a pair of main trawl wires each incorporating a trawl board disposed a short distance along the length of the wire from the net mouth, the upper edge of the net mouth being connected at opposite ends thereof to one of a pair of auxiliary trawl wires of very short length each connected to one of the two main trawl wires at a short distance along the length thereof from the net mouth.

In such an arrangement the net is dragged along the bottom of the sea bed so that the mouth of the net is at the forward side thereof in the direction of advancement of the net, the trawl boards serving to maintain the net at the bottom of the sea bed and no special means are provided for keeping the mouth of the net open beyond the two very short auxiliary wires above mentioned.

Thus in addition to being adapted to serve only as a bottom trawl so that the vegetation on the sea bed is damaged or destroyed as above described, the mouth of the trawl net by reason of the provision only of the very short auxiliary wires is kept open to a very limited vertical depth with consequent limitation on the ability of the net to entrap the fish.

The primary object of the present invention is to provide a trawl which can be used for fishing at varying depths between the bottom and surface of the sea so that the vegetation on the sea bed is undisturbed by the trawl during the fishing operation with consequent absence of disturbance of the fish spawn and fry in which the trawl net when drawn through the sea is capable of presenting an open mouth of a vertical depth substantially greater than that of the bottom trawl aforementioned so as to be well adapted to entrap the fish.

With this primary object in view according to the present invention there is provided a floating trawl for fishing comprising a trawl net of substantially pocket-like configuration having an open mouth at one end thereof, which mouth presents upper and lower edges when the net is drawn through the water with the mouth at the forward end of the net, a pair of main trawl wires connected to the trawl net mouth at positions substantially at opposite ends of said lower edge of the mouth, each of said main trawl wires being connected to the net through an associated trawl board which trawl boards are adapted during trawling to flare relativly apart and to move in a downward direction in the water so as to apply an opening movement to the lower edge of the net mouth in both a lateral and a downward direction, one or more auxiliary trawl wires connected at one end thereof to the upper edge of said net mouth, and said auxiliary trawl wire or wires being at the opposite end thereof connected in the case of one wire to each of said main trawl wires, or in the case of two auxiliary wires each to one of said main trawl wires, the point of connection to the main trawl wires in each case being on the opposite side of said trawl boards to said net and at a sufficient distance from said net as to permit of said auxiliary wire or wires during trawling applying an upward force to the upper edge of said net mouth so as both to keep this fully open during trawling and also to permit of the net being drawn through the sea at a height clear of the sea bed.

A subsidiary object of the invention is to provide a trawl net for use in a floating trawl as above described in which the mesh is of rectangular, for example, square configuration. Trawl nets have hitherto been made of netting in which each net mesh is of rhombus configuration.

With a net having a mesh of square or rectangular and particularly of square mesh configuration the young immature fish can pass through the meshes in the net more easily than is the case with a net whose mesh is of the hitherto known configuration above indicated so that the proportion of young or immature fish in the catch will be reduced.

The invention is illustrated in the accompanying drawings, wherein:

Figure 4 is a detail view of a still further enlarged scale of part of the trawl depicted in Figure 1.

Figure 1:
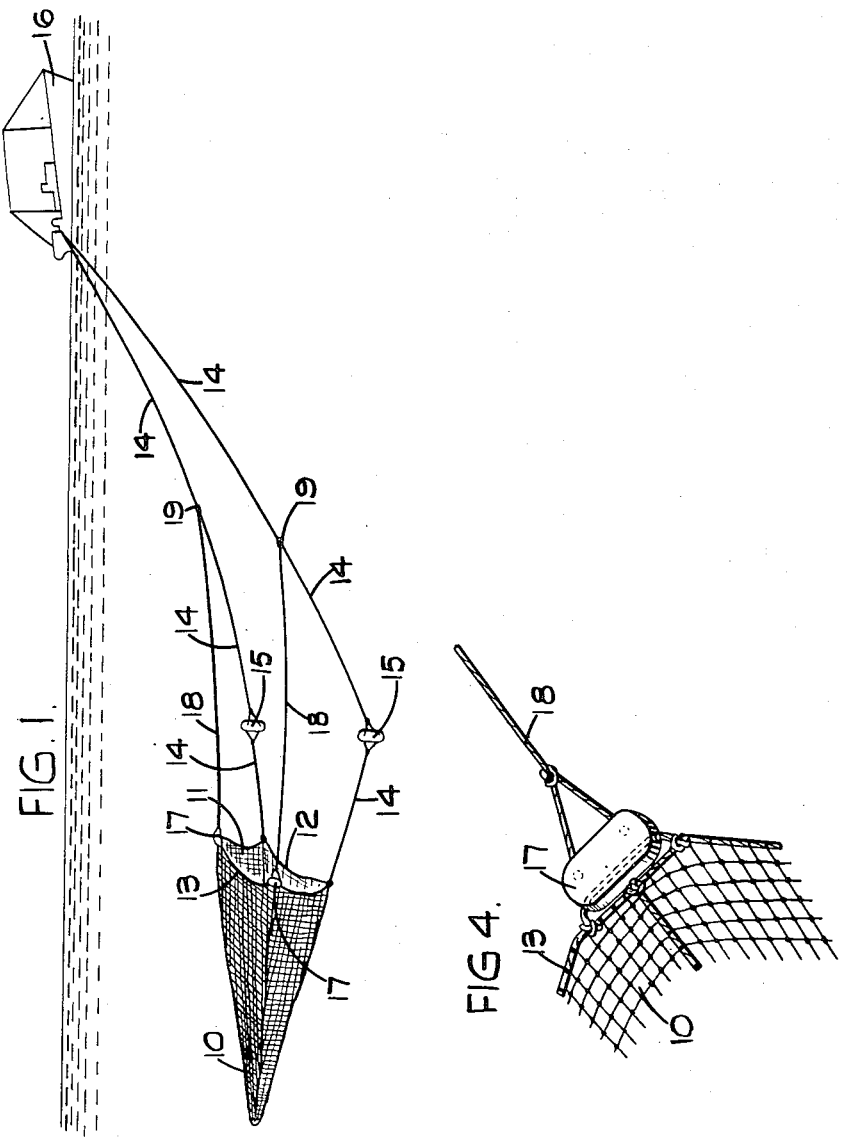
Figure 1 is a diagrammatic side view of one form of trawl embodying the present invention.
Figure 2:
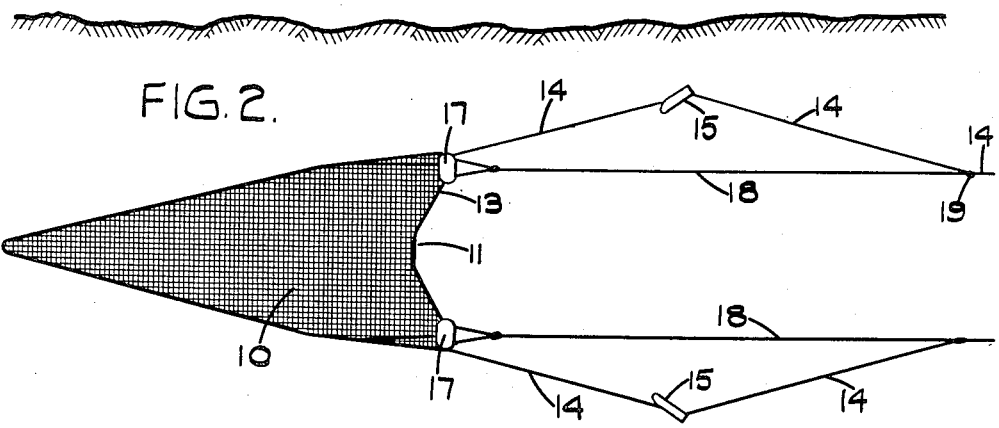
Figures 2 and 3 are plan views and side elevations, respectively, on an enlarged scale of part of the trawl depicted in Figure 1.

Referring firstly to Figures 1 to 4 of the drawings, the trawl there illustrated comprises a trawl net 10 of elongated tapered pocket-like configuration so as to be provided at one end with an open mouth 11 which like the net itself is of somewhat rectangular form in cross section so as to present lower and upper edges 12, 13 respectively, which edges are substantially horizontal when the net is being drawn through the water.

The net 10 is formed from netting material of known form except that the meshes of the material are of rectangular or, for example, as shown, square configuration instead of being of rhombus configuration for the purposes above described.

To the opposite ends of the lower edge 12 of the net mouth 11 are attached main trawl wires 14 which are in effect attached to the net at the two lower corners of the substantially rectangular mouth 11 and each of these main trawl wires 14 incorporate in the known manner main trawl boards 15 which are adapted in the known way to flare relatively apart when the net is drawn through the water by pulling on the main trawl wires 14 in the known manner, such movement apart of these main trawl boards serving to keep the lower portion of the net mouth wide open in a lateral horizontal direction.

The main trawl boards 15 are further of such a specific gravity and shape as when pulled by the trawl wires 14 to flare downwardly in the sea and thus keep the lower edge of the net mouth open in a downward direction.

The main trawl wires 14 would be connected to a trawling vessel indicated at 16 in the usual manner.

To opposite ends of the upper edge 13 of the net mouth is secured float means in the form of a pair of floats or auxiliary boards 17 which are adapted during trawling to apply an upward force to the upper edge of the net mouth so as to open this in an upward direction and through these floats or auxiliary boards 17 are connected to each of these ends or corners of the net mouth auxiliary wires 18, the opposite end of each of these two auxiliary wires being connected to the main trawl wires 14 at a position 19 along the length thereof which is on the side of the main trawl boards 15 remote from the net 10 and at a substantial distance from the mouth of the net and by the expression "substantial distance" is here meant a distance which is at least equal to the overall length of the net.

As will be seen each auxiliary wire 18 is connected to one main trawl wire 14.

Figure 3:
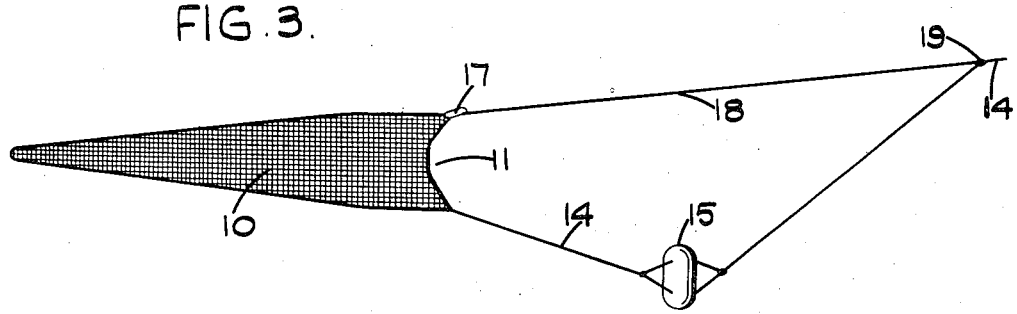

During trawling the main trawl wires 14 will be disposed at an inclination to the horizontal as indicated diagrammatically in Figure 1 with the main trawl boards 15 occupying the lowest horizontal position and the net including the net mouth at a horizontal level somewhat higher than the level of the trawl boards 15. The point of connection 19 of each auxiliary wire 18 to the main trawl wires 14 is in fact at such a distance along the wires 14 in a direction away from the net 10 as to ensure that the auxiliary wires are connected at 19 to the main wires at a level which during trawling is higher than the upper edge of the net mouth to which these auxiliary wires are connected so that the auxiliary wires extend in an upward as well as a horizontal direction from the net mouth to the main trawl wires as indicated in Figure 3 and consequently during trawling exert an upward force as well as a horizontal force on the upper edge of the net mouth tending to open the mouth in an upward direction as well as to keep the net at the required level clear of the sea bed.

Thus by virtue of this particular disposition of the auxiliary wires 18 the net mouth is kept well open and at the same time the net does not sink to the sea bottom during trawling.

Instead of using netting for the net the meshes of which are of the configuration above described, the known rhombus configuration may be used although the arrangement above described is preferred.

A floating trawl in accordance with the present invention can be used for trawling at any depth between the sea surface and bottom and avoids the disadvantages above mentioned of the hitherto known bottom trawl.

What I claim then is:

1. A floating trawl for use in sea fishing comprising a trawl net of elongated configuration having a mouth opening of generally rectangular shape so as to present upper and lower substantially horizontal edges, a pair of main trawl wires connected at one end directly one to each of the two lower corners of the net mouth, and adapted to be connected at their opposite end to a single trawling vessel, a pair of auxiliary trawl wires connected at one end one to each of the upper corners of the net mouth, and connected at their other end one to each of the main trawl wires at a position intermediate the ends of said main trawl wires, and a trawl board disposed in each of the main trawl wires at a position intermediate the connection of the auxiliary wires thereto and the net mouth and disposed nearer the latter than to the position at which the main wires are connected to the auxiliary wires, said trawl boards being spaced away from the net mouth by a substantial distance, namely, approximately half the overall length of the elongated trawl net, said trawl boards constituting the sole means for applying through the main trawl wires the required downward and outward force to the lower edges of the net mouth to keep the same open without at the same time being sufficiently close to the net as to be calculated to scare away fish in the vicinity of the net mouth during the trawling operation.

2. A floating trawl for use in sea fishing comprising a trawl net of elongated configuration having a mouth opening of generally rectangular shape so as to present upper and lower substantially horizontal edges, a pair of main trawl wires connected at one end directly one to each of the two lower corners of the net mouth and adapted to be connected at their opposite end to a single trawling vessel, a pair of auxiliary trawl wires connected at one end one to each of the upper corners of the net mouth, and connected at their other end one to each of the main trawl wires at a position intermediate the ends of said main trawl wires, and spaced away from the net mouth by a distance at least equal to the overall length of the elongated trawl net, and a trawl board disposed in each of the main trawl wires at a position intermediate the connection of the auxiliary wires thereto and the net mouth and disposed nearer the latter than to the position at which the main wires are connected to the auxiliary wires, said trawl boards being spaced away from the net mouth by a substantial distance, namely, approximately half the overall length of the elongated trawl net, said trawl boards constituting the sole means for applying through the main trawl wires the required downward and outward force to the lower edges of the net mouth to keep the same open without at the same time being sufficiently close to the net as to be calculated to scare away fish in the vicinity of the net mouth during the trawling operation.

3. A floating trawl for use in sea fishing comprising a trawl net of elongated tapered configuration having a mouth opening at one end thereof and a closed cod end at the opposite end thereof, said net including the cod end thereof being formed wholly from netting material having a mesh of rectangular configuration with the sides of the mesh openings extending parallel and perpendicular to the length of the net, said net mouth opening being of rectangular configuration so as to present upper and lower substantially horizontal edges, a pair of main trawl wires connected at one end directly one to each of the two lower corners of the net mouth, and adapted to be connected at their opposite end to a single trawling vessel, a pair of auxiliary trawl wires connected at one end one to each of the upper corners of the net mouth, and connected at their other end one to each of the main trawl wires at a position intermediate the ends of said main trawl wires, and a trawl board disposed in each of the main trawl wires at a position intermediate the connection of the auxiliary wires thereto and the net mouth and disposed nearer the latter than to the position at which the main wires are connected to the auxiliary wires, said trawl boards being spaced away from the net mouth by a substantial distance, namely, approximately half the overall length of the elongated trawl net, said trawl boards constituting the sole means for applying through the main trawl wires the required downward and outward force to the lower edges of the net mouth to keep the same open without at the same time being sufficiently close to the net as to be calculated to scare away fish in the vicinity of the net mouth during the trawling operation.

4. A floating trawl for use in sea fishing comprising a trawl net of elongated tapered configuration having a mouth opening at one end thereof and a closed cod end at the opposite end thereof, said net including the cod end thereof being formed wholly from netting material having a mesh of rectangular configuration with the sides of the mesh openings extending parallel and perpendicular to the length of the net, said net mouth opening being of rectangular configuration so as to present upper and lower substantially horizontal edges, a pair of main trawl wires connected at one end directly one to each of the two lower corners of the net mouth, and adapted to be connected at their opposite end to a single trawling vessel, a pair of auxiliary trawl wires connected at one end one to each of the upper corners of the net mouth, and connected at their other end one to each of the main trawl wires at a position intermediate the ends of said main trawl wires, and spaced away from the net mouth by a distance at least equal to the overall length of the elongated trawl net, and a trawl board disposed in each of the main trawl wires at a position intermediate the connection of the auxiliary wires thereto and the net mouth and disposed nearer the latter than to the position at which the main wires are connected to the auxiliary wires, said trawl boards being spaced away from the net mouth by a substantial distance, namely, approximately half the overall length of the elongated trawl net, said trawl boards constituting the sole means for applying through the main trawl wires the required downward and outward force to the lower edges of the net mouth to keep the same open without at the same time being sufficiently close to the net as to be calculated to scare away fish in the vicinity of the net mouth during the trawling operation.

References Cited in the file of this patent

UNITED STATES PATENTS

| | | |
|---|---|---|
| 2,137,663 | Aspenburg | Nov. 22, 1938 |
| 2,523,925 | Sorensen | Sept. 26, 1950 |

FOREIGN PATENTS

| | | |
|---|---|---|
| 22,822 | Great Britain | 1895 |
| 228,673 | Great Britain | Feb. 12, 1925 |
| 620,566 | France | Jan. 22, 1927 |
| 662,725 | France | Mar. 25, 1929 |